United States Patent [19]

Yamada

[11] Patent Number: 5,800,139
[45] Date of Patent: Sep. 1, 1998

[54] ELECTROMAGNETIC OIL PUMP

[75] Inventor: Seiichiro Yamada, Iwata, Japan

[73] Assignee: Yamada Hatsudoki Kabushiki Kaisha, Iwata, Japan

[21] Appl. No.: 713,250

[22] Filed: Sep. 12, 1996

[30] Foreign Application Priority Data

Oct. 13, 1995 [JP] Japan ................... 7-265637
Oct. 31, 1995 [JP] Japan ................... 7-283897

[51] Int. Cl.⁶ ................................................ F04B 17/04
[52] U.S. Cl. ..................... 417/416; 417/417; 417/533
[58] Field of Search ............................. 417/416, 417, 417/533, 418

[56] References Cited

U.S. PATENT DOCUMENTS

| | | | |
|---|---|---|---|
| 2,029,780 | 2/1936 | Mazer et al. | 417/416 |
| 2,382,426 | 8/1945 | Kocher | 417/416 |
| 2,524,645 | 10/1950 | Abbott | 417/417 |
| 2,578,902 | 12/1951 | Smith . | |
| 2,630,345 | 3/1953 | Mesh | 417/417 |
| 3,479,959 | 11/1969 | Christensen | 417/418 |
| 3,740,171 | 6/1973 | Farkos | 417/418 |
| 4,671,745 | 6/1987 | Smith | 417/533 |
| 4,750,871 | 6/1988 | Curwen | 417/418 |
| 5,009,580 | 4/1991 | Maru | 417/533 |
| 5,316,452 | 5/1994 | Bogen et al. . | |

FOREIGN PATENT DOCUMENTS

| | | | |
|---|---|---|---|
| 2822442 | 12/1979 | Germany . | |
| 3046048 | 8/1982 | Germany | 417/418 |
| 3719460 | 1/1988 | Germany . | |

*Primary Examiner*—Timothy Thorpe
*Assistant Examiner*—Ted Kim
*Attorney, Agent, or Firm*—Knobbe, Martens, Olson & Bear LLP

[57] ABSTRACT

An electromagnetic pump has a solenoid reciprocating a piston that abuts the ball of a first, one-way ball valve coaxially aligned with the piston axis. In the abutting position the piston closes the valve and provides a pump chamber of very small volume. An second, one-way outlet valve is located orthogonal to the first valve to provide a compact structure and further minimize the volume of the pump chamber. A plurality of these inlet valves can be arranged so the pistons are parallel and activated by a single, solenoid activated piston, with the outlet valves being radially orientated to provide a compact structure that simultaneously provides precise fluid amounts to a plurality of locations, such as multiple pistons of a two cycle engine.

18 Claims, 14 Drawing Sheets

ELECTROMAGNETIC OIL PUMP

BACKGROUND OF THE INVENTION

This invention relates to electromagnetic oil pumps of the type used to lubricate two cycle engines. One such pump is shown in FIG. 1, where a pump chamber 20 is in fluid communication with an oil intake passage 22 and an oil outlet passage 24. One-way valves 26, 28, close these inlet and outlet passages 22, 24, respectively. Valves 26, 28 comprise balls 30 urged against valve seats by resilient members such as actuating springs 32 so that the valves 26, 28 are normally closed and block the passage of fluid through the one-way valves. When the pressure in the oil inlet passage overcomes the force of spring 32 in the first valve 26, then the ball 30 moves away from the valve seat to allow the passage of oil. Such valves, and variations of these one-way valves are known in the art and not described in detail herein.

The pump chamber 20 is also in fluid communication with a piston 34 that reciprocates in a fluid tight manner in a cylindrical cavity in the pump housing. A shaft 36 is connected to the piston 34 and also extends through solenoid 38 so that the solenoid moves the shaft 36 and piston 34 when the solenoid is electrically activated. A spring 39 in the pump chamber 20 urges the piston against a stop. The pump chamber 20 is thus bounded by the first and second valves 26, 28, the piston 34, and the associated fluid passages. This piston 34 is commonly oriented orthogonal to the fluid path between the first and second valves 26, 28 with the valves 26, 28 being located along a common axis.

As the solenoid 38 moves the piston 34, the volume of the chamber 20 changes. When the solenoid 34 is activated, the piston 38 moves in the downward direction in FIG. 1, causing the chamber volume to decrease, and the chamber pressure to increase. This pressure increase urges the first valve 26 closed and urges the second valve 28 open so that oil is pumped out of the chamber 20 into the outlet passage 24. When the power to the solenoid is shut off, the spring 39 moves piston 34 in the upward direction of FIG. 1, and the volume of pump chamber 20 increases. This increased volume creates a suction that urges the first valve 22 open and allowing oil to flow into the chamber 20, while simultaneously helping the spring 32 close the second valve 28. As the piston 34 reciprocates, the valves 26, 28 open and close to pump oil through the chamber 20 and out the passage 24. The change in the volume ΔV of the pump chamber 20 defines the amount of oil pumped each cycle.

Unfortunately, the pump chamber 20 has a large volume V as it includes not only the chamber where the piston 34 reciprocates, but the volume accommodating spring 39, the associated fluid passages leading to the valves 26, 28, and the volume in which valve 26 reciprocates in order to operate and allow oil to enter. Because the changes in volume ΔV of pump chamber 20 is defined by the compression ratio ΔV/V, and because the volume V is large, the compression ratio is undesirably low. A small compression ratio impairs the functional stability of the one-way valves 26, 28 and allows inaccuracies in the opening and closing of the valves. One common instability occurs when air enters the chamber 20. Being much more compressible than oil, air causes fluctuations in the amount of oil pumped, and can cause air lock on either the intake or compression stroke. For example, the air can cause a lack of suction sufficient to prevent the inlet valve 26 from opening at all, or from opening wide enough and long enough to admit the expected flow of oil. There is thus a need for a pump that can reduce, if not eliminate the difficulties occurring when air enters the pump chamber.

Further, because the volume of chamber 20 and associated passages to the valves 26, 28 is relatively large, the amount of oil pumped with each stroke of the piston 34 is relatively large. Thus, it is impossible to precisely dispense small amounts of oil with each stroke of the piston 34. This inaccuracy increases as air enters the chamber 20. The result is that too little oil can enter the engine, causing excessive wear. Alternatively, too much oil can enter the engine causing oil smoke, increased pollutants, and increased oil consumption. There is thus a need for a pump that more precisely controls the amount of oil that is pumped. There is a further need for a pump that can be adjusted to vary the amount of oil dispensed with each stroke of the piston 34.

Moreover, these pumps are bulky and do not lend themselves to compact designs for multiple outlets. Further, if plural pumps are used to provide oil to multiple outlets, engine parts or engine cylinders, the pump output varies among pumps as each solenoid moves slightly differently than others. Thus, each pump must be individually and periodically adjusted in attempts to maintain the same oil flow to each outlet, engine part or engine cylinder. There is thus a need for a pump that can provide uniform amounts of fluid to each of several locations or cylinders in an engine. There is also a need for a pump that solves these problems yet is simple to assemble and maintain.

SUMMARY OF THE INVENTION

The present invention resolves the above, and other problems by providing a pump chamber and piston moveable relative to one another to define a chamber with a smaller minimum volume than previously achievable, thereby allowing smaller and more precise amounts of fluid to be pumped. This smaller volume is achieved by locating at least a portion of one valve in the pump chamber and coordinating the movement of the piston relative to the pump chamber and valve operation so that the piston enters the volume occupied by that valve without restricting the valve operation. For a pump using the one-way ball valves discussed above, one ball valve can advantageously be placed in the bottom of the pump chamber so the ball moves into the pump chamber to open the valve. At one extreme of travel the piston can abut the ball and positively close the inlet to define a minimum volume of the chamber in conjunction with the chamber walls and any associated fluid passage to any outlet valve. Advantageously the piston reciprocates relative to a stationary chamber to pump fluid from the chamber as the piston approaches the valve located in the chamber.

Thus, the piston and chamber wall may advantageously define a pair of relatively moveable pumping members defining a pumping chamber of a volume that varies cyclically upon relative movement of the members. At least one one-way valve is provided to control the flow of fluid upon such relative movement in at least one direction. The one-way valve includes a valve element moveable between an opened position and a closed position in response to pressure differences from relative movement of the members. The valve element is positioned within the pumping chamber when it is in one of the open or closed positions. The valve element is at a location occupied by one of the pumping members when that one pumping member is at at least one position of its relative movement.

Advantageously, the pump chamber comprises a minimum volume of less than about 0.1 cc, and dispenses about 0.001 cc to 0.05 cc of oil per stroke. Because of the small pump chamber volume small piston movements create large pressure changes to actuate the valves, and to provide more accurate pumping of fluid from the chamber.

In one specific embodiment, these advantages are achieved by using a pump with a first one-way valve aligned along a first axis that is common with the axis of a piston reciprocating in a chamber. The first valve comprises a first ball urged against a first valve seat by a first spring. The piston is constrained to reciprocate along the first axis and positioned relative to the first valve so that the piston is immediately adjacent, and preferably contacting the first ball at one extreme limit of travel to close the first valve. The first spring is interposed between the first ball and the piston to urge the ball and piston apart.

A second one-way valve aligned along a second axis that is not aligned with the first axis, and preferably is orthogonal to the first axis. This second valve is associated with and in fluid communication with the first valve. The second valve comprises a second ball resiliently urged against a second valve seat. By placing the first and second balls being adjacent one another this invention advantageously defines a pump chamber with a minimum volume smaller than the volume of one of the balls, and preferably less than about 0.1 cc. Preferably, the fluid pumped through the second valve with each pumping stroke of the piston is between about 0.001 to 0.05 cc.

A solenoid is placed in driving communication with the piston to cause the piston to move to a predetermined position when power is applied to the solenoid, with the first spring urging the piston to an alternate position when power is not applied to the solenoid. With this arrangement the power is advantageously applied to the solenoid for between about 10 msec to 40 msec. In a further embodiment, a spring urges the piston against the first ball to close the first valve when power is not applied to the solenoid, to provide a positive valve seal.

This pump is very suited to multi-cylinder engines that require the same amount of oil pumped to multiple cylinders. This is achieved in one specific embodiment by considering the first valve and first piston in fluid communication with the associated second valve to comprise a sub-assembly. A plurality of such sub-assemblies are aligned so that the pistons reciprocate along axes that are substantially parallel, and so the outlet or second valves are radially orientated. A single solenoid is placed in driving communication with each of the pistons to move all of the pistons the same predetermined distances when power is applied to the solenoid. Having a common solenoid move plural pistons provides a simultaneous and uniform volume change to each pump chamber, and provides a uniform amount of oil to each pump outlet. Thus, each cylinder of a multi-cylinder engine can receive the same volume of oil simultaneously with the other cylinders. The ability to have a single solenoid move multiple pistons results in improved engine performance, lubrication and reductions in pollution.

In further embodiments, the chamber volume can be varied by moving a cam to adjust the position of the piston in response to the operating condition of the engine. This advantageously varies the volume of oil pumped to suit the engine's needs. Further, a piezoelectric element can be interposed between the piston and solenoid so that electrical energy is generated by the piezoelectric element when the solenoid moves the piston. This energy is detected to verify the solenoid is activated and to provide a positive indication that the pump is activated. Additionally, the piston may be electrically conductive and placed in electrical communication with a sensor that detects the completion of an electrical circuit when the solenoid moves the piston.

There is thus provided a pump where the piston that compresses the fluid is cooperates with one of the one-way valves to simplify construction and reduce the volume of the pump chamber. Further, a very compact pump is achieved by appropriate positioning of the inlet and outlet valves and by having the piston and one valve not only in a common chamber but using a common volume for operation of the piston and valve. Thus, a smaller pump chamber can be obtained to more precisely control the fluid dispensed from the chamber. The ability of piston to contact one of the valves provides positive valve closure during the pumping cycle.

These and other advantages of this invention will become apparent from a reading of the following detailed description and the associated drawings.

DETAILED DESCRIPTION OF THE PREFERRED EMBODIMENT

Figure 2:
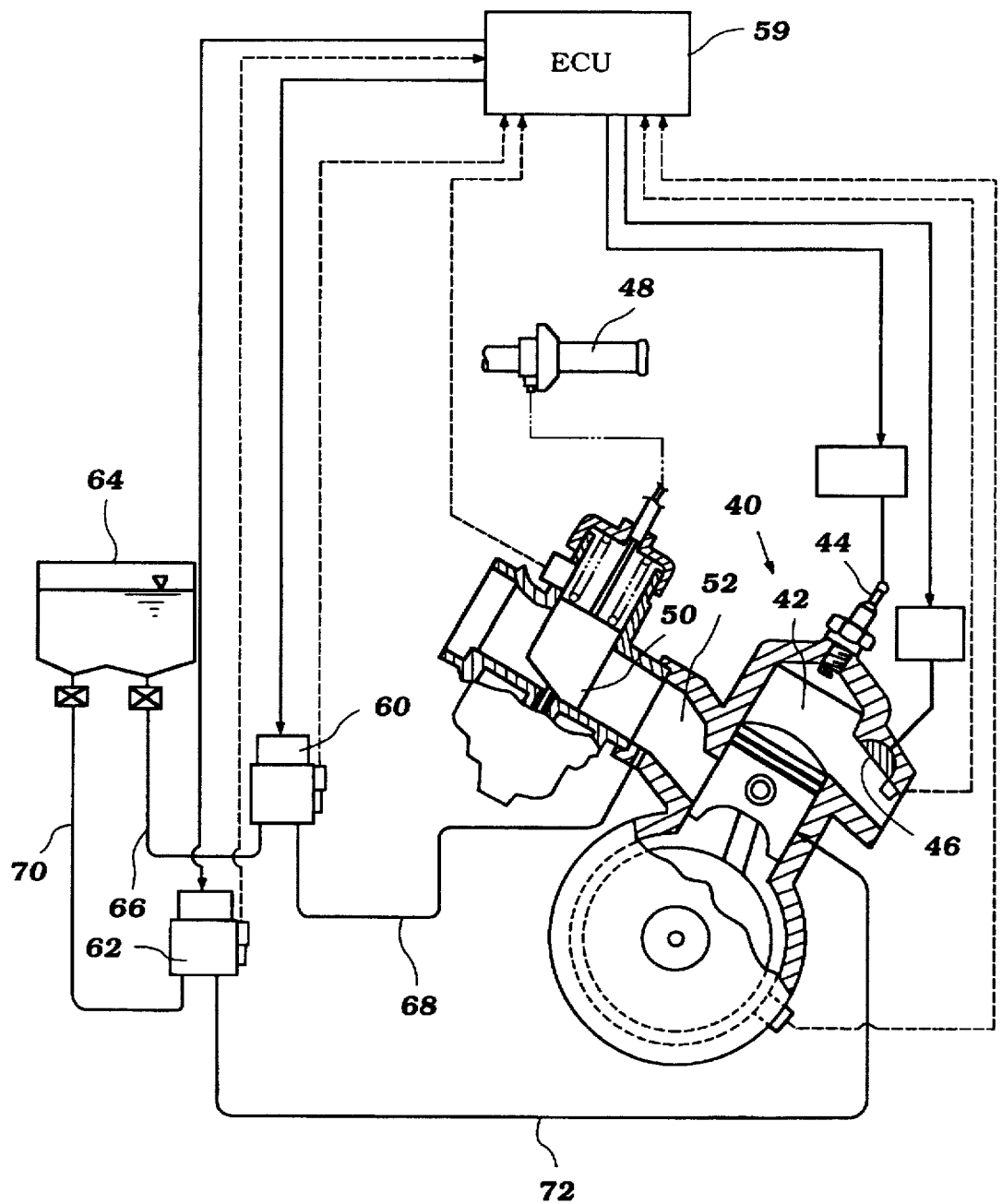
FIG. 2 is a block diagram showing the structure of the control system of a two cycle engine that includes electromagnetic pumps according to this invention.

FIG. 2 shows the electromagnetic pump of this invention used in conjunction with a two-cycle engine 40. The engine 40 comprises a crankshaft driven by a piston reciprocating in a cylindrical combustion chamber 42 where a mixture of air, fuel and oil is ignited by sparkplug 44. An engine control unit 59 (ECU) controls the ignition sequence in a manner known in the art and not described in detail herein. The ECU 59 also controls a variable exhaust timing valve 46 located on the exhaust of the motor 40. A throttle 48 controls a piston-type throttle valve 50 in a carburetor in order to vary the amount of fuel flow to the engine 40. The throttle valve 50 is in fluid communication with the air inlet 52 through which the air fuel mixture enters the engine 40.

Two electromagnetic pumps 60, 62 are in fluid communication with oil reservoir 64 and also the engine 40 to pump oil from the reservoir to the engine. Oil intake line 66 transfers oil from the reservoir 64 to the pump 60, while oil outlet passage 68 transfers the oil from the pump 60 to the air inlet 52. The pump 62 has oil inlet passage 70 in fluid communication with the oil reservoir 64, and pumps the oil through outlet 72 to the crankcase of engine 40 to lubricate the reciprocating piston. The pumps 60, 62 are in electronic communication with the ECU which controls the pumps 60, 62. Given the present disclosure, this electrical communication is known to one of skill in the art and will not be described in further detail herein.

The electromagnetic pumps 60, 62 are preferably of the same design and, thus, only one will be described herein. In actual use, the amount of oil provided by each pump 60, 62 may differ. For example, the oil to the air intake 52 may differ from the amount of oil to the other parts of the engine in order to meet the specific needs of the engine.

Figure 3:
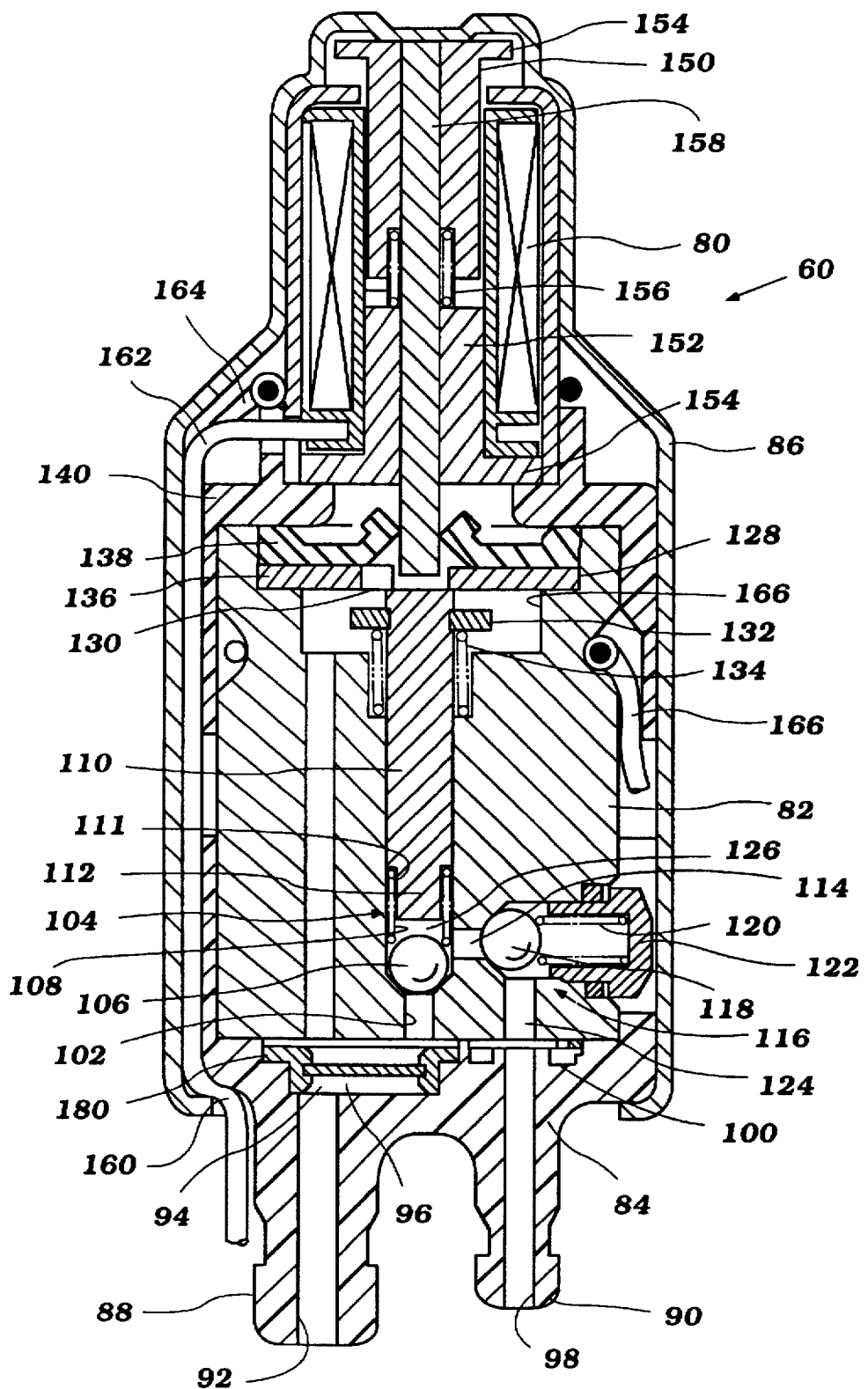
FIG. 3 is a cross sectional view of an electromagnetic pump according to this invention.

As shown in FIG. 3, the electromagnetic pump 60 has three basic parts or sub-assemblies, comprising a solenoid 80, a pump body 82, and an end cap 84, all enclosed in a sheet metal housing 86. While in actual use, the orientation of the pump 60 may vary, but for ease of description here the upper portion of the pump as shown in FIG. 3 will be referred to as the "top" direction, and the lower portion of the pump will be referred to as the "bottom" direction. In actual use the pump orientation can change, but these relative positions will be used for ease of reference in this description.

Thus, the end cap 84 is located at the bottom of the pump 60, and contains means, such as inlet stub 88 and outlet stub 90, that connect to oil inlet passage 66 (FIG. 2) and oil outlet passage 68 (FIG. 2), respectively. End cap 84 has a circular shaped top, with a tubular passages 92 extending through the inlet stub 88. At the top end of end cap 84 is a cylindrical cavity 94 in fluid communication with the top end of passage 92. An oil filter 96 extends across the diameter of the cavity 94. A tubular passage 98 also extends through the outlet stub 90. The top portion of the end cap 84 abuts the bottom of the pump housing 82. Packing rings, such as O-rings 100, surround the cavity 94 and the top of passage 98 to provide a seal between the pump housing 82 and send cap 84.

The aluminum pump body 82 has a generally cylindrical shape, with a multi-shaped aperture along its longitudinal axis. At the bottom, center of the pump body 82 is an oil inlet passage 102 that is in fluid communication with cavity 94. The upper end of inlet passage 102 ends in a valve seat that forms part of a one-way chamber valve 104. A variety of valve types could be used, but this invention will be described using ball valves. The valve 104 thus comprises ball 106 and spring 108 that urges the ball against the valve seat to open and close the inlet passage 102. This chamber valve 104 is advantageously orientated parallel to the longitudinal axis of the pump body 82, and preferably coincides with that longitudinal axis. In operation the ball 106 moves into the volume encompassed by spring 108 in its extended position, to open and close the valve 104.

A piston 110 is also slidably located along the longitudinal axis of housing 82 in a chamber 111. The piston 110 and chamber 111 advantageously have conforming shapes and closely conforming sizes to provide a pumping action when they are moved relative to one another. Preferably, the piston 110 and chamber 111 are cylindrical, although other shapes can be used. A recessed cylinder head 112 is formed on the bottom of the piston 110, so that the head 112 has a smaller cylindrical diameter than the body of the piston 110 to form a shoulder against which rests one end of spring 108. The head 112 extends inside the coil spring 108, so that when the spring 108 is compressed the head 112 contacts ball 106 to urge it against the valve seat to close the passage 102. The spring 108 is thus imposed between the piston 110 and ball 106, and urges the piston away from the ball 106. The diameter of the ball 106 is advantageously about the same diameter as, or slightly smaller than, the diameter of the piston head 112.

This first one-way chamber valve 104 is different than the normal one-way valve construction in that the spring 108 does not rest against a housing, but rests against a shoulder on the piston with a portion of the piston inside the spring 108. Thus, the chamber valve 104 is coaxial with the axial movement of piston 110 and piston head 112, all of which are preferably aligned with the longitudinal axis of the pump body 82. In operation the ball 106 moves toward and away from the piston head 112 along the volume encompassed by spring 108 in the spring's extended position. Moreover, as the piston 110 and head 112 move relative to chamber walls 111, the head 112 also extends into the volume encompassed by spring 108 when the spring is in its extended operational position.

A radial passage 114 is located just above the centerline of the ball 106, adjacent the end of the valve seat against which the ball 106 rests. The passage 114 preferably extends orthogonally to the longitudinal axis of inlet passage 102 and chamber valve 104. The radial passage 114 opens into a radially orientated one-way valve 116 comprising ball 118 which is urged against a valve seat by spring 120 to close the valve 116. The valve 116 and its fluid passage 114 are thus not aligned with the axis of valve 104 and piston 110. A plastic cap 122 has one end limiting movement of spring 120, and its other end abutting seal 123 on pump body 182 to enclose the valve 116 and prevent leakage of fluid.

An outlet passage 124 adjacent the ball 122 forms a fluid communication with radial passage 114 when the valve 116 is opened. Passage 124 is preferably parallel to the longitudinal axis of pump body 82, but radially outward from that axis. The outlet passage 124 is also in fluid communication with the outlet passage 98 in outlet stub 90, with a packing ring 100 preventing fluid leakage from the connection between passages 124 and 98. There is thus advantageously provided a first one-way valve 104 in fluid communication with and associated with a second one-way valve 116.

A pump chamber 126 is defined by the balls 106, 118, piston head 112 and radial passage 114. The volume of this chamber 126 changes with the movement of the piston 110 and piston head 112 relative to the chamber 111 such that the piston head 112 extends into the chamber 126. As shown in FIGS. 3 and 5d, the minimum volume of chamber 126 is preferably less than the volume of either ball 106, 118. The balls 106, 118 of the one-way valves 104, 116 are in surface contact or linear contact with the pump body 82. By using surface contact, any dimensional deviations can be absorbed, and by using linear contact, it is possible to obtain a very tight seal in the one-way valves 106, 118. This is true with the other one-way ball valves described in this specification.

Referring to FIG. 3, the top end of the pump body 82 has a cylindrical cavity 128 centered on the longitudinal axis of the body 82 at the top end of the body 82. The top end 130 of the piston 110 extends into this cavity 128. End 130 has a circumferential groove into which is inserted a spring retainer ring 132. A spring 134 surrounds the top end 130 and is located between the retainer ring 132 and the bottom of the cavity 128 to resiliently urge the piston 110 upward. The spring 134 is advantageously located in a further recessed portion at the bottom of cavity 128, and coaxially with the reciprocating, longitudinal axis of piston 110.

A piston stop ring 136 is connected to the walls of the cavity 128, advantageously to a shoulder around the top end of the cavity 128. The stop ring 136 resembles a flat washer, and advantageously comprises a flat metal disk with a central aperture that is small enough so that the top end 130 of the piston 110 cannot pass the stop ring 136. Thus, the springs 134 and 108 urge the piston 110 toward the stop ring 136, with ring 136 limiting the motion of the piston 110 in one direction. The ball 106 and its valve seat limit the motion of piston 110 in the opposite direction.

An oil seal 138 is held within the cavity 128, and advantageously is placed on top of the stop ring 136. The oil seal 138 advantageously comprises a rubber disc with a central aperture that sealingly engages the walls of the cylindrical cavity 128. A retainer cap 140 is placed over the sides and top end of pump body 82. The cap 140 has a central aperture, and extends over a portion of cavity 128. Advantageously, the location of the stop ring 136 and oil seal 138 are such that the retainer cap 140 holds the ring 136 and seal 138 against the shoulder on cavity 128 to axially position the ring 136 and seal 138.

Still referring to FIG. 3, the solenoid 80 has a generally cylindrical shape, with a cylindrical cavity along its longitudinal centerline into which are inserted upper and lower guide members 150, 152, respectively. Guide members 150, 152 have cylindrical bodies configured to fit inside the solenoid 80, but have radially extending flanges 154 extending over the top or bottom of the solenoid 80 to prevent the guide members from passing through the cavity in the solenoid 80. The guide members 150, 152 are resiliently urged apart by spring 156, interposed between members 150, 152. Spring 156 is advantageously retained by an axially recessed shoulder on one of guide members 150, 152. The flange 154 on the bottom guide member 152 rests against the top of the cap 140, with the housing 86 engaging the top guide member 150 to urge the flange 154 on the bottom guide member 152 against the cap 140.

The guide members 150, 152 have a cylindrical aperture at the longitudinal axis of the members. A rod 158 is inserted into this aperture. Rod 158 connects to the top guide 150, but slides through the aperture in the bottom guide 152. The spring 156 thus urges the top guide 150 and rod 158 upward against housing 86. The rod 158 extends through the apertures in the cap 140, the oil seal 138 and stop ring 136. The oil seal 138 is in resilient contact with the rod 158 to sealingly engage the rod, but the seal does not prevent axial reciprocation of the rod 158. Depending on the activation of the solenoid 80, the bottom end of the rod 158 can engage the top of piston 110, but the spring 156 urges the rod 158 out of contact with the top of the piston 110. The housing 86 limits the upward movement of the rod 158 by contacting the flange 154 on the upper guide member 150. As the flange 154 on the upper guide member 150 extends over the outside of the solenoid 80, that flange 154 also limits the downward motion of the rod 158, and limits the position of piston head 112 relative to the ball 106.

Figure 6:
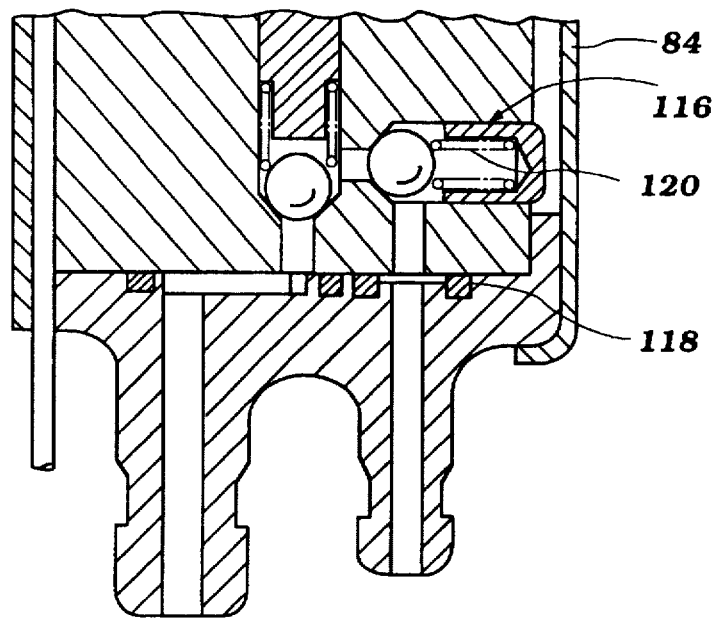
FIG. 6 is a cross-sectional view of a portion of the embodiment shown in FIG. 4.
Figure 4:
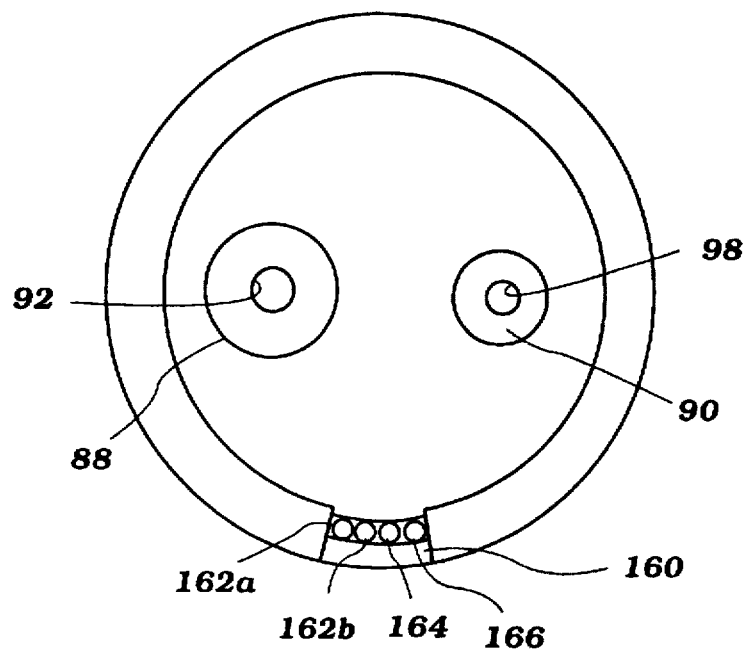
FIG. 4 is a bottom view of an alternate embodiment of a of the pump of FIG. 3.

Wires 162, 164 and 166 are in electrical communication with the ECU 59 (FIG. 2), and pass into the housing 86 between the end cap 84 and housing 86. In an alternate embodiment shown in FIGS. 4 and 6, there is a notched cut 160 in the housing 86, through which these wires 162, 164, 166 extend. However the wires enter the pump 60, the wires 162a, 162b are connected to the solenoid 80, wire 164 is in electrical communication with the rod 158, and wire 166 is in electrical communication with piston 110.

The operation of pump 60 will now be explained with respect to FIGS. 3 and 5a–5d to illustrate how the relatively moving pumping members cooperate with one valve to share common volumes and thus reduce the volume of pump chamber 126. When no current is applied to the solenoid 80 (when it is OFF), as is shown in FIG. 3 and 5c, the rod 158 is pushed upward by the force of the spring 156, to rest against the housing 86. At this time and location, the rod 158 is separated from the piston 110 so that a gap of a predetermined length is formed between the piston 110 and rod 158. The piston 110 is also held upward by the force of springs 108, 134, and the top end 130 of the plunger 110 is in contact with the stop 136. At this time and location, the end of the piston head 112 is separated from the ball 106 inside the pump chamber 126 by a distance of ΔS.

Referring to FIGS. 3 and 5a, when current is passed through the wires 162 to the solenoid 80 to turn it ON, the electromagnetic force generated by the solenoid 80 causes the rod 158 to overcome the force of the spring 156 and to descend to contact the piston 110. The piston 110 is urged downward by the solenoid 80 until the bottom surface of the piston head 112 is immediately adjacent to, and preferably contacts and is stopped by, the ball 106. As this happens, oil inside the pump chamber 126 is compressed by the volume ΔV (=the surface area A of the bottom end surface of the piston 110 times the stroke ΔS), and, due to the resulting increased oil pressure, the pressure overcomes the force of the spring 120 to push the ball 118 "open" in the outlet side of the one-way valve 116. This causes a volume of oil equal to ΔV to be pushed from the pump chamber 126 to the pump outlet passages 124 and 98. As shown in FIG. 2, the oil passes through the outlet line 68 to the air intake passage 52 of the two-cycle engine 40 to become intermixed with the air/fuel mixture flowing to the combustion chamber. After the piston 110 contacts the ball 106 and the oil is expelled from the chamber 106, the spring 120 urges the one-way valve 116 closed, as shown in FIG. 5d.

When the current to the solenoid 80 is stopped (OFF), the electromagnetic force disappears, allowing the force from the spring 156 to return the rod 158 upward to the position that is shown in FIGS. 3 and 5c. The spring force generated by the springs 108, 134 also push the piston 110 upward until it comes to rest against the stop 136. During this movement of the piston 110, a negative pressure or suction is generated inside the pump chamber 126, and this negative pressure causes the force that is exerted by the spring 108 on the ball 106 in the one-way chamber valve 104 on the intake side to be overcome and the valve 104 opened, as shown in FIG. 5b. An amount of oil equal to ΔV then flows from the oil tank 64 (FIG. 2) through the oil supply line 66 (FIG. 2), through oil intake passage 92, cavity 24, filter 96, and the oil intake passage 102 to the pump chamber 126. The above described operation is then repeated to cause the piston 110 to reciprocate up and down, causing the intermittent pumping of specific volumes ΔV by the electromagnetic pump 60.

The valve 104 uses a portion of the volume of chamber 126 to operate as the a spring 108 compresses to allow ball 102 to move upward and admit oil into the chamber 126, as shown in FIG. 5b. This portion of chamber 126 used to operate valve 104 is also used by piston 110 and head 112 as they move relative to chamber walls 111 to expel oil from chamber 126 as shown in FIGS. 5a and 5d. The volume required to operate the inlet valve is also traversed or used by the piston 110, and specifically is traversed by piston head 112 as it abuts the ball 106. The piston 110 is moved relative to chamber 111 and valve 104 such that the operation of valve 104 is not interfered with. Indeed, the piston 110 can contact the valve 104 to ensure the valve is closed at one extreme of travel of the piston 110.

The chamber walls 111 and piston 110 thus advantageously provided a pair of relatively moveable pumping members defining a pumping chamber 126 of a volume that varies cyclically upon relative movement of the members. In the illustrated embodiment the piston 110 moves relative to the chamber wals 111, but given the present disclosure one skilled in the art could devise ways for moving the chamber 111 relative to a stationary piston 110. The one-way valve 104 controls the flow of fluid upon such relative movement in at least one direction, with the specific embodiment showing the control of the inlet fluid. But the outlet flow is also controllable with suitable modifications known to one skilled in the art given the present disclosure. The one-way valve 104 has a valve element moveable between an opened position and a closed position in response to pressure differences across the valve element. In the illustrated embodiment that moveable valve element comprises the ball 106, but the specific nature of the moveable element will vary with the particular type of valve used. The valve element is positioned within the pumping chamber when the valve element is in one of the opened or closed positions, and when the valve element is at a location occupied by one of the pumping members at at least one position of the pumping members relative movement.

Thus, the movement of piston 110 is coordinated with the operation of the valve 104 so that the piston cyclically traverses the same space or volume in the pump chamber 126 that was previously occupied by the inlet valve 104 when the valve 104 is in one of an opened or closed position. In the illustrated embodiment the piston 110 traverses the space previously occupied by the valve 104 in the open position. The valve 104 and piston 110 alternatingly occupy a common space or volume, and the use of this common space by both the valve 104 and piston 110 allows a smaller pump chamber 126.

Figure 1:
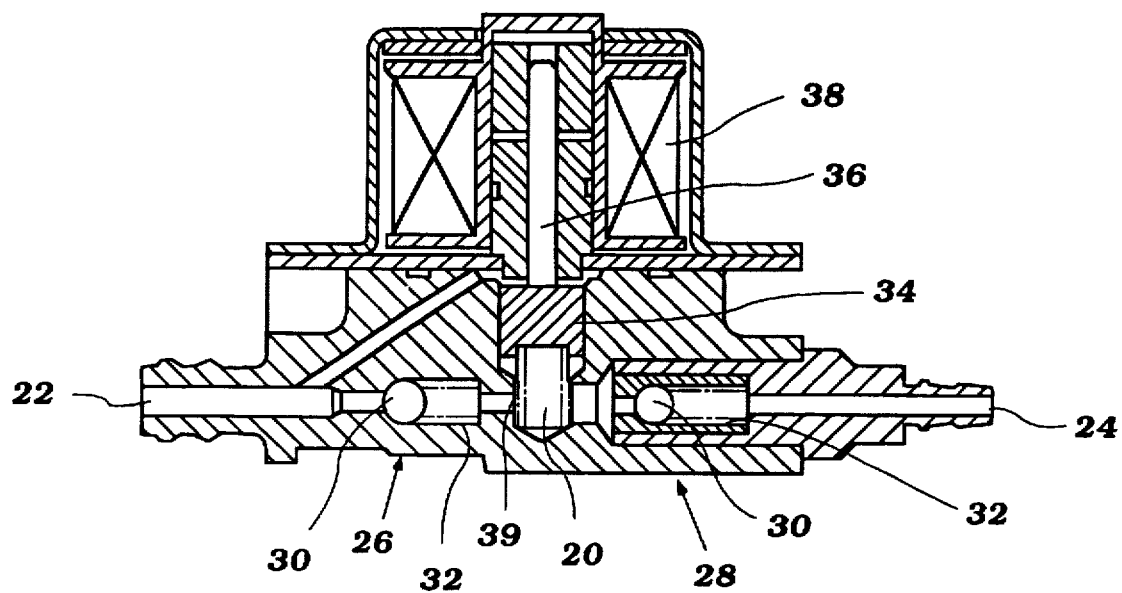
FIG. 1 is a sectional view of a prior art pump.

As illustrated by the above described embodiment, because the one-way chamber valve 104 and the piston 110 are positioned coaxially with the direction of movement of the piston (vertical in FIG. 1), and because the piston 110 extends into the portion of the pumping chamber 126 that is intermittently occupied by the valve 104, it is possible to not only use a simpler structure, but to reduce the size and volume of the chamber 126. This reduction in the volume V of the pump chamber 126 increases the oil compression ratio $\Delta V/V$. As a result, the possibility of air lock is prevented, enhancing the stable operation of both one-way valves 104, 116.

Further, because the amount of oil $\Delta V$ output during each cycle (one reciprocating movement of the piston 110) is held to a minimum, it is possible to reliably supply small amounts of oil to the engine 40 (FIG. 2), and to control the small amounts with high precision based upon the RPM or load of the engine as detected by speed sensors on the engine, by throttle sensors, or by other factors that may affect the operating state of the two-cycle engine 40 (FIG. 2), such as crankcase pressure, oil temperature, water temperature, stub base temperature, etc. Advantageously, when the two-cycle engine 40 is operating at low speeds and low loads, the number of cycles per unit time of the piston 110 can be decreased, resulting in a diminished supply of oil, and when operating under high speeds and high loads, the number of reciprocating cycles of the piston 110 can be increased to increase the supply of oil. Further when the engine 40 is being started, the oil supply is held to a minimum for easier starting.

Furthermore, an electrical ON signal through the two lead wires 162a, 162b can be fed into the ECU 59 (FIG. 2) when the current is applied to the solenoid 80 and the rod 158 makes contact with the piston 110. This allows monitoring the solenoid 80 to confirm it is activated. Further, an electrical OFF signal can be fed into the ECU 59 (FIG. 2) when the current of the solenoid 80 is cut to provide confirmation the solenoid 80 is deactivated. Moreover, if the rod 158 and plunger 110 are electrically conductive, then because wires 164, 166 are connected to these parts, when the rod 158 separates from the piston 110 the electrical circuit formed through these two parts will be broken and the solenoid operation can be ascertained electrically by checking the ON-OFF signal status. These various electrical verifications of the solenoid activation, and confirmation of the piston engagement with the solenoid, make the pump 60 very reliable and fail-safe.

Figure 5:
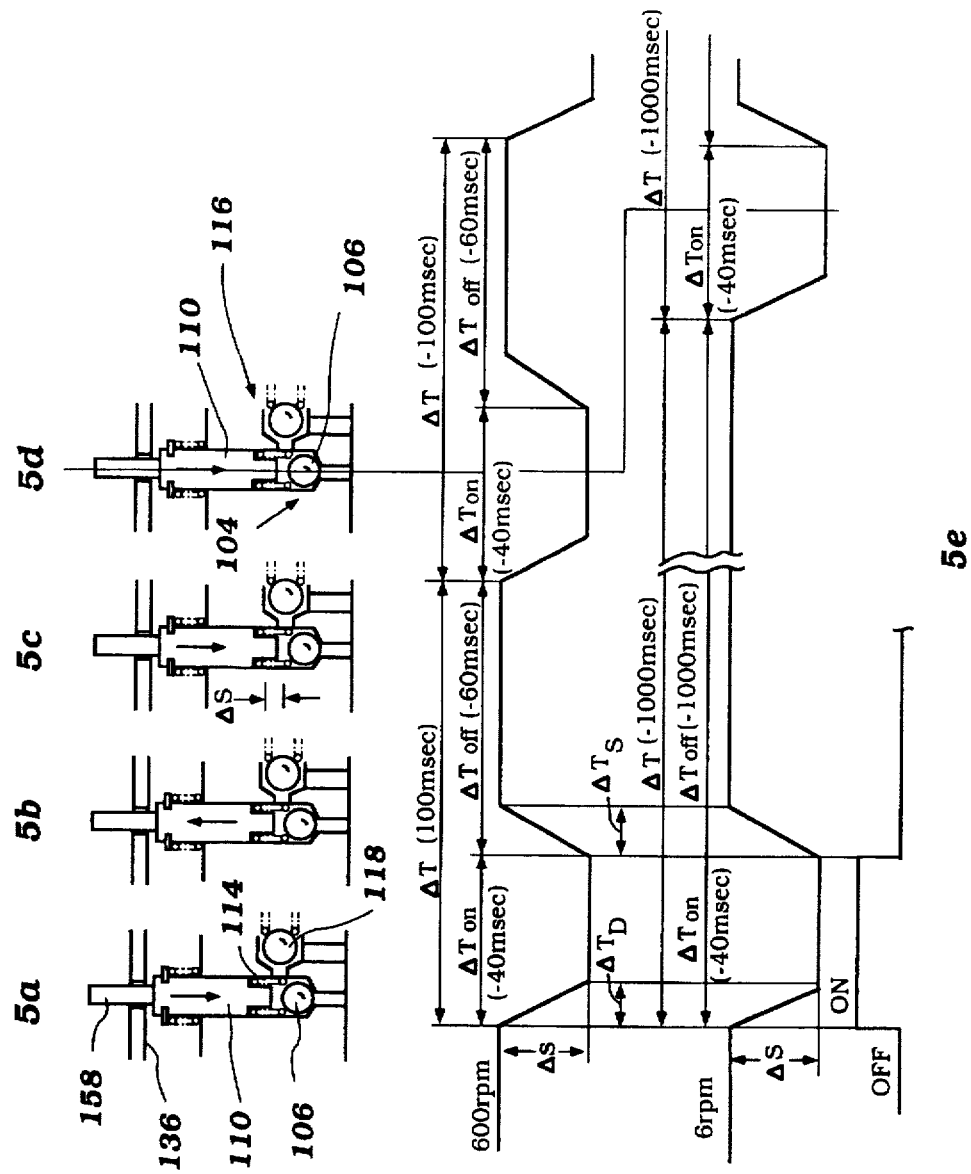
FIG. 5 is a block diagram showing the timing sequence of the pump of this invention, along with cross-sectional views of the pump at various stages of operation.

FIG. 5 also shows the timing sequence of the pump operation. When the piston 110 descends inside the pump chamber 126 by $\Delta S$, it comes to rest against the ball 106 as is shown in FIG. 2(d), whereupon the oil pumping is completed with the pumping of an amount of oil equal to $\Delta V$=the area A of the bottom end surface of the piston times the stroke length $\Delta S$ from the pump chamber 126 to the pump outlet passage 2. $\Delta V$ is defined as the time required for the piston 110 to descend through a stroke of $\Delta S$ to contact the ball 106 is $\Delta T_D$, as shown in FIG. 5, and the solenoid 80 is left ON even after the piston 110 has come to rest against the ball 106, for a time $\Delta T_{ON}$ that is longer than $\Delta T_D$. $\Delta TD$ is a time interval that is sufficient to completely expel any air contained in the oil in the pump chamber 126.

In some situations, the number of oil pumping cycles N per unit of time (1 min) of the electromagnetic pump 60 may equal the RPM, but advantageously, the number of pumping cycles N is set to be a small fraction of the RPM of the two-cycle engine 40 (FIG. 2). Preferably, the number N of pumping cycles per minute is between 0.6/2000 to 600/10, 000 cycles times the RPM of the two cycle engine 40. FIG. 5 shows a plunger stroke timing chart for the number of oil pumping cycles at 600 rpm and 6 rpm. The ON time $\Delta T_{ON}$ for the solenoid 80 is not always constant (40 msec) with respect to the engine RPM. The solenoid ON time $\Delta T_{ON}$ should be adequate for completely expelling any air included with the oil in the pump chamber, and advantageously $\Delta T_{IB}$=10 ms or more, and preferably between 10 ms and 40 ms.

As shown in FIG. 5c when the piston 110 rises by the amount of $\Delta S$ in the pump chamber 126 and then comes to rest against the stop 136, at that point, the oil intake is completed to an intake of oil $\Delta V$ into the pump chamber 126. The area A of the bottom end surface of the piston 110 times the stroke length $\Delta S$. The time for the piston 110 to rise in the stroke $\Delta S$ to come to rest against the stop 13 is $\Delta T_S$.

Thus, the cycle time $\Delta T$ from the beginning of oil pumping to the completion of intake can be determined based upon the operating state of the two-cycle engine 40 (e.g., the number of oil pumping cycles N per unit of time). The off-time $\Delta T_{OFF}$ required for the solenoid 80 is controlled on the basis of the amount of oil pumped for the engine RPM, N.

$$\Delta T_{OFF} = \frac{60 \times 1000}{N - \Delta T_{ON}} \quad (1)$$

As shown by equation 1, the higher the engine RPM, the greater the oil pumping requirement for the electromagnetic pump 60, and the shorter the cycle time ΔT setting. As is shown in FIG. 5, if the settings for the cycle time ΔT for 600 rpm and 6 rpm engine speeds are 100 msec and 10,000 msec respectively, the OFF time $\Delta T_{OFF}$ times are 60 msec and 9960 msec respectively. The repetition of the above-described operation causes the reciprocating movement of the plunger 110 up and down to intermittently pump an amount ΔV by the electromagnetic pump 60.

As reflected in FIG. 3 and shown in FIG. 5d, the minimum volume of chamber 126 is smaller than the volume of either ball 106, 108. This minimum volume, or dead space $V^1$ in the pump chamber 126, is equal to the volume V of the pump chamber 126 minus the volume ΔV of oil pumped. Preferably the minimum volume $V^1$ of the chamber 126 is about 0.1 cc, and the oil output volume ΔV is advantageously between 0.001 cc and 0.05 cc. Preferably the output volume is set to be 0.05 cc. Thus, the preferred volume output ΔV is half the minimum chamber volume $V^1$, but can advantageously be as little as one-hundredth (0.01) the minimum volume. Using the present invention the oil compression ratio, defined by the following Equation 2, can be increased to 0.33. This results in high negative and positive pressures generated in the pump chamber 126.

$$\text{Compression ratio} = \frac{\Delta V}{V} = \frac{\Delta V}{(V^1 + \Delta V)} \quad (2)$$

This results in a valve-opening pressure of 0.3 kg/cm² for the one-way valves 104, 116. This design prevents air locks and offers more stable operation of the one-way valves. Also, since oil output ΔV per pump cycle is small (0.05 cc/cycle), small quantities of oil can be reliably supplied.

To achieve the foregoing effects, it is advantageous to hold the dead space $V^1$ of the pump chamber to 0.1 cc or less, and the oil pump output ΔV to 0.001 to 0.05 cc/cycle. Even more advantageously, the stroke ΔS of the piston 110 of the electromagnetic pump 60 can be varied according to the operating state of the two-cycle engine 40 within this ΔV range.

Figure 7:
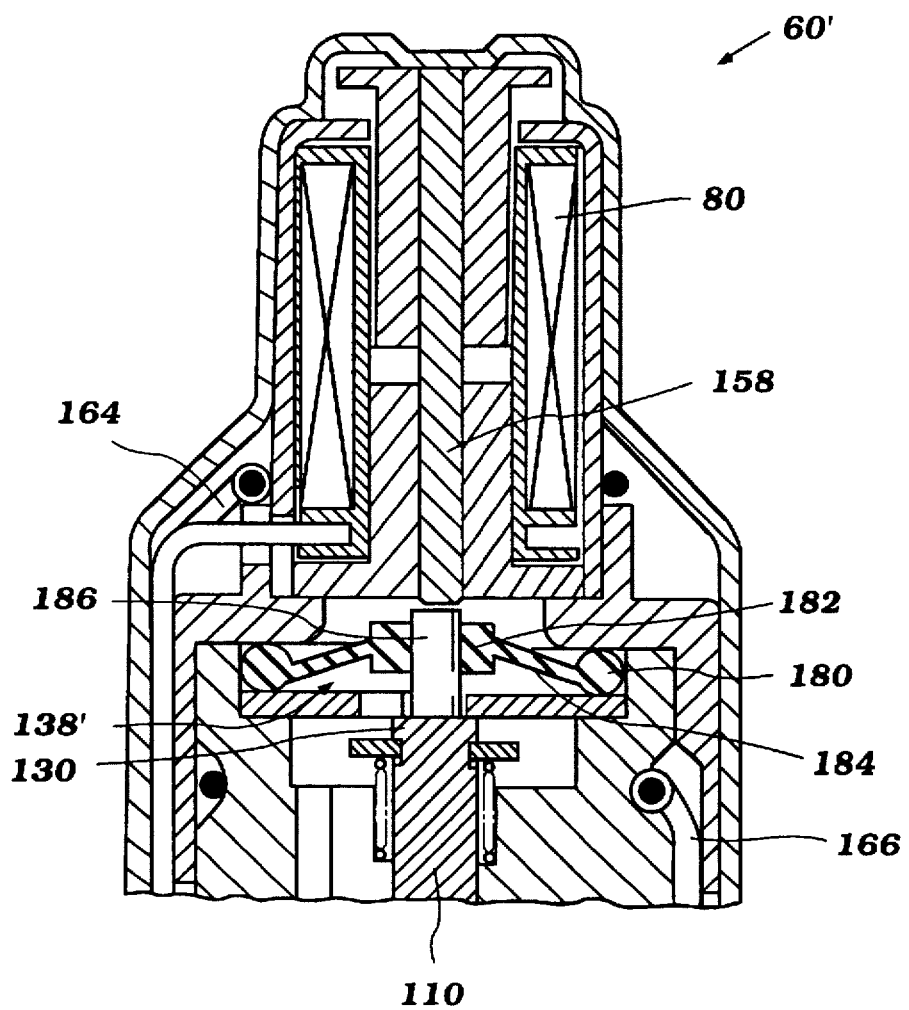
FIG. 7 is a cross-sectional view of an alternate embodiment of an electromagnetic pump according to this invention.

Second Embodiment: A second embodiment of the pump 60' is shown in FIG. 7, in which like numbers refer to like parts that were previously described. Here the rubber oil seal 138' comprises inner and outer flanges 180, 182, respectively, connected by a thinner flexible disc 184 to form a diaphragm seal 138'. The inner flange 180 sealingly engages a cylindrically shaped piezoelectric element 186 that is interposed between the rod 158 and the top end 130 of piston 110. The piezoelectric element 186 is advantageously attached to the top end surface of the piston 110, and the diaphragm seal 138' seals around its circumference.

When no current is applied to the solenoid 80, the rod 158 is separated from the piezoelectric element 186 by a predetermined distance as shown in the FIG. 7. It is also possible, but not preferred, that the gap be zero so that the rod 138 contacts the piezoelectric element 186 when no current is applied to the solenoid 186.

The rod 158 is electrically connected to the wire 164, and the piezoelectric element 186 is electrically connected to piston 110 and thus to wire 166. When the current to the solenoid 80 is repeatedly switched ON-OFF, the piston 110 moves reciprocatingly up and down to perform the required pumping action. But when current is applied to the solenoid 80, the rod 158 applies pressure to the piezoelectric element 186 which generates piezostatic electricity that is electrically communicated through wires 164, 166, and detected by the ECU 59 (FIG. 2) to verify the solenoid 80 is urging the piston 110 to move, and thus verifies the operation of the solenoid 80. This design assures that said electromagnetic pump is highly fail-safe.

Figure 8:
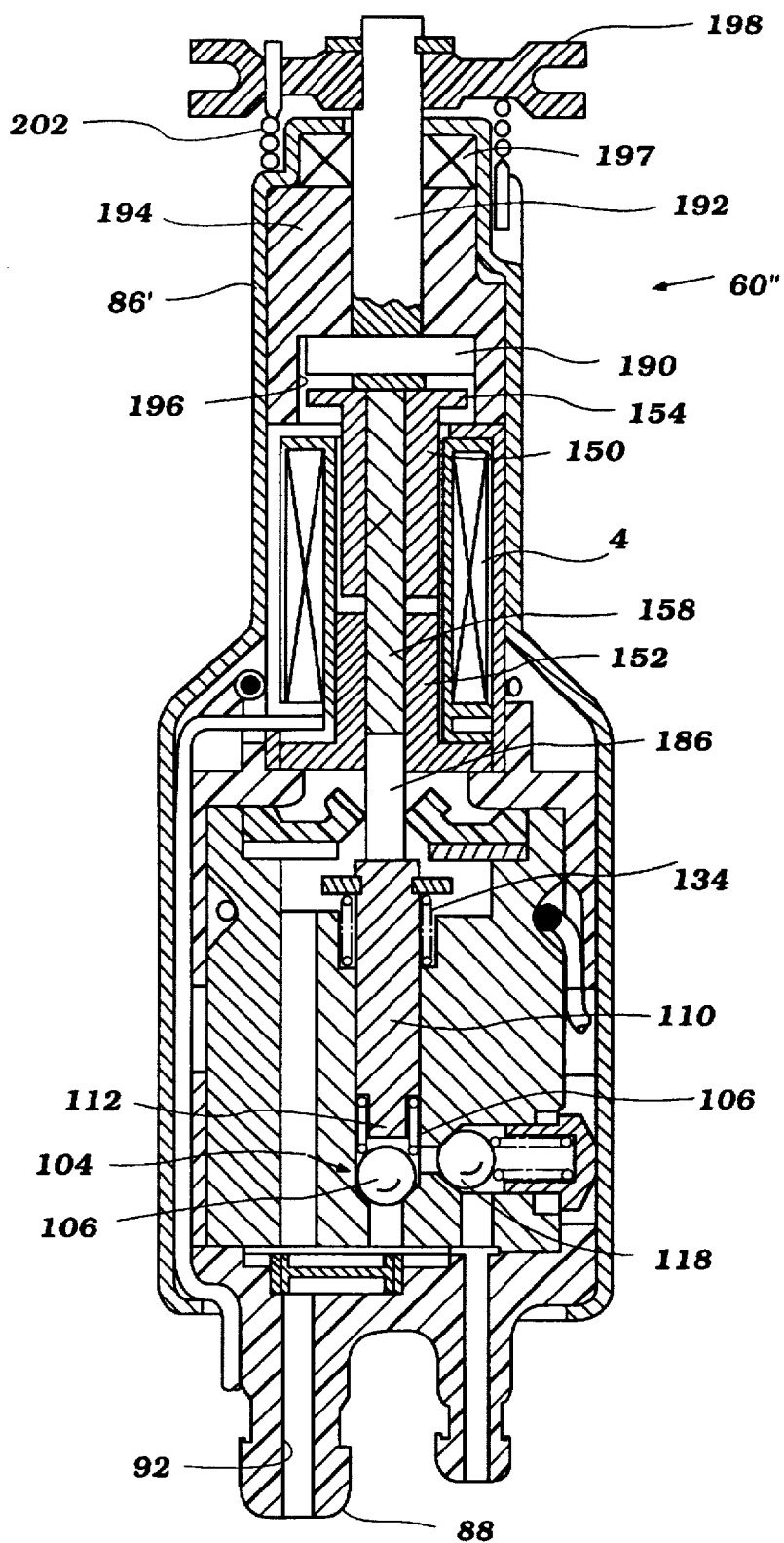
FIG. 8 is a cross-sectional view of a further embodiment of an electromagnetic pump according to this invention.

Third Embodiment: A third embodiment of the pump 60" of the present invention is shown in FIG. 8, in which elements with like numbers refer to previously described elements. In this embodiment the spring 156 (FIG. 3) between the upper and lower guide members 150, 152 is omitted. The springs 106, 134 urge the piston 110, piezoelectric member 186, and rod 158 upward.

The upper guide member 150 is urged against the bottom of a shaft 192 to which is mounted a plastic cam 190. The shaft extends through a cylindrical aperture in a cam guide 194. The cam guide has a cylindrical cavity 196 in its bottom end, with the cam 190 contained in that cavity 196. An oil seal 197 located at the top of the cam housing sealingly engages the shaft 192. The housing 86' encloses the cam guide 194, but contains an aperture through which the top end of shaft 192 extends. A pulley 198 is connected to the top end of shaft 192, with spring 200 urging the pulley 198 and shaft 192 upward, away from the chamber valve 104. The spring 200 also urges the cam 190 against the top surface of the cavity 196. The cam 190 and the cavity 196 are configured to form a cam and cam follower so that rotation of the shaft 192 and cam 190 cause the shaft 192 to move longitudinally toward, or away from, chamber valve 104, effectively changing the stroke of the piston 110, altering the ΔS and the resulting change in volume ΔV of the chamber 126. A wire (not shown) is connected to the pulley to rotate the shaft 192 and cam 190, causing the rod 158 to move toward or away from the valve 104. The wire may be manipulated in response to the operating state of the two cycle engine 40 (FIG. 2) to vary the position of the rod 158, piston 110 and head 112 relative to ball 106 in chamber valve 104.

Thus, there is advantageously provides a means for adjusting the volume of fluid pumped from the chamber 126 with each stroke of piston 110 of pump 60". Further, referring to the prior discussion of FIG. 5, the manipulation of the wire makes it possible to vary the stroke ΔS of the piston 110 and to vary the OFF time $\Delta T_{OFF}$ of the solenoid 80, compared with conventional electromagnetic pumps, so that it is possible to expand the range of control over the amount of oil that is pumped by the variable amount of ΔS, thereby expanding the dynamic range of the electromagnetic pump using a simple design.

Figure 9:
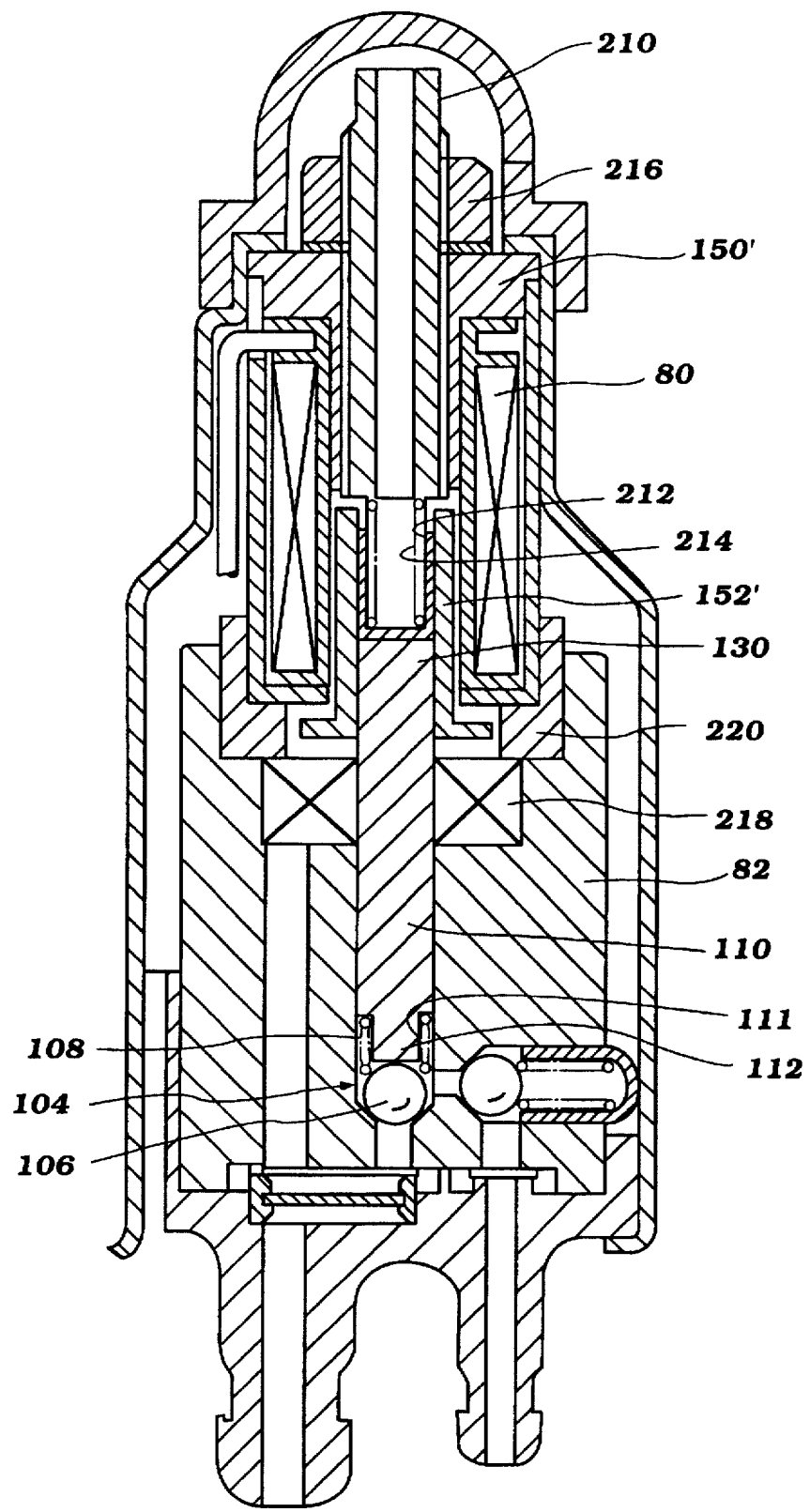
FIG. 9 is a sectional view of a further embodiment of an electromagnetic pump according to this invention.

Fourth Embodiment: A fourth embodiment of the pump 60 of the present invention is shown in FIG. 9, in which elements with like numbers refer to previously described elements. In this embodiment the upper guide member 150' covers the top of the solenoid 80, and has an enlarged central, cylindrical aperture into which is threaded a cylindrical metal spring holder 210. The lower guide member 152' has its central, cylindrical aperture enlarged to receive and be connected to the top end 130 of piston 110 which reciprocates relative to chamber 111. The piston 110 does not extend into the entire length of the central aperture of the guide 152' but leaves a portion of the cylindrical aperture empty. In to that empty space is inserted an insulating plastic cup 212. The cup 212 abuts the top end 130 of piston 110. A spring is interposed between the piston 110 and spring holder to resiliently urge the piston 110 toward chamber valve 104. specifically. A spring 214 is placed inside the insulating cup 212 and disposed between the top end 130 of piston 110 and the bottom of the spring holder 210 to urge the piston 110 downward toward the chamber valve 104. The electrical connection between the spring holder 210 and the spring 212 is interrupted by the cup 212, to prevent electrical contact with the piston 110.

A lock nut 216 threadingly engages the outside of spring holder 210 to adjustable position the bottom of spring holder 210 relative to the top end 130 of piston 110. The top end of the pump body has a cylindrical cavity that receives a packing seal or oil seal 218 that surrounds and seals the reciprocating piston 110. A retaining nut 220 threadingly engages the interior walls of the cavity in the upper end of pump body 82 to hold the seal 218 in place. The retaining nut 220 is also configured to receive and position the solenoid 80.

When no current is applied to the solenoid 80, the piston 110 is pushed downward by the spring 214, with the spring 214 being selected to overcome the spring 108 of the chamber valve 204 so that the piston head 112 pushes against the ball 106 to close off the one-way chamber valve 104. At this time, there is a gap of a predetermined size between the bottom of the spring holder 210 and the top of the conductive lower guide member 152'.

In the position shown in FIG. 9, when current is applied to the solenoid 80, electromagnetic force causes the piston 110, the lower guide member 152' to rise and move away from valve 104, with the force of spring 108 urging that upward motion. The lower guide member 152' will stop movement of the piston 110 when the guide member 152' hits the bottom of spring holder 110. This movement generates a negative pressure or suction in the pump chamber 126, and this negative pressure causes the one-way chamber valve 104 on the intake side to open, and to allow an amount of oil equal to ΔV to enter the chamber 126.

Because the one-way valve 104 on the intake side and the piston 110 are disposed to share some common operating space that is used intermittently by the piston 110 and valve 104, benefits similar to those delivered by the first embodiment can be obtained. Further, because the ball 106 of the one-way chamber valve 104 on the intake side is pressed against the valve seat by the piston 110 when no current is being applied to the solenoid 80, any possibility of oil flowing at this time through the valve 104 is eliminated. Moreover, the operation of the solenoid 80 can be confirmed by the electrical ON-OFF signal that accompanies the breaking of contact between the spring holder 210 and the guide member 152', thereby assuring highly fail-safe operation of the electromagnetic pump 60.

Figure 10:
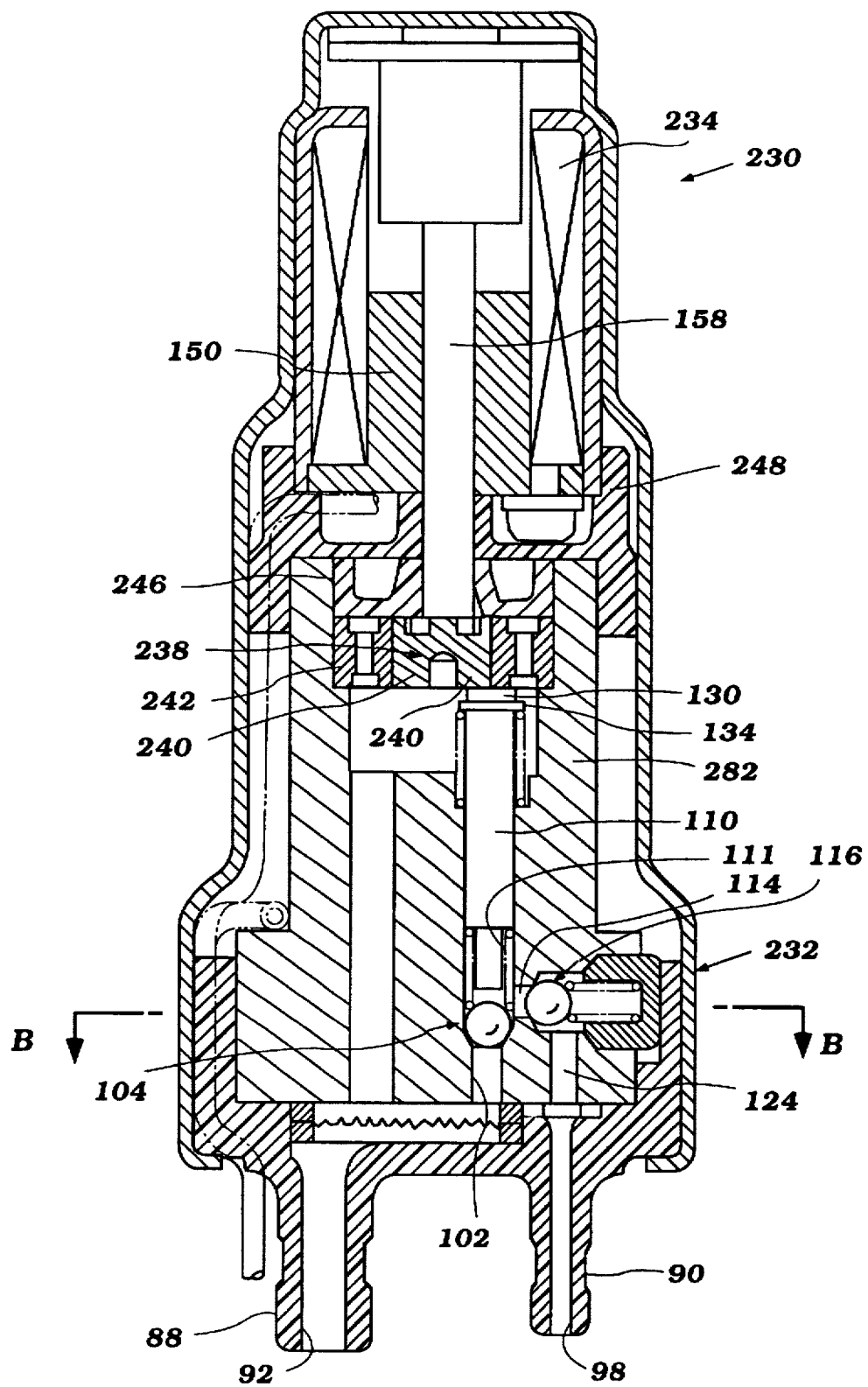
FIG. 10 is a sectional view of a further embodiment of an electromagnetic pump of this invention taken along line A—A of FIG. 11.
Figure 11:
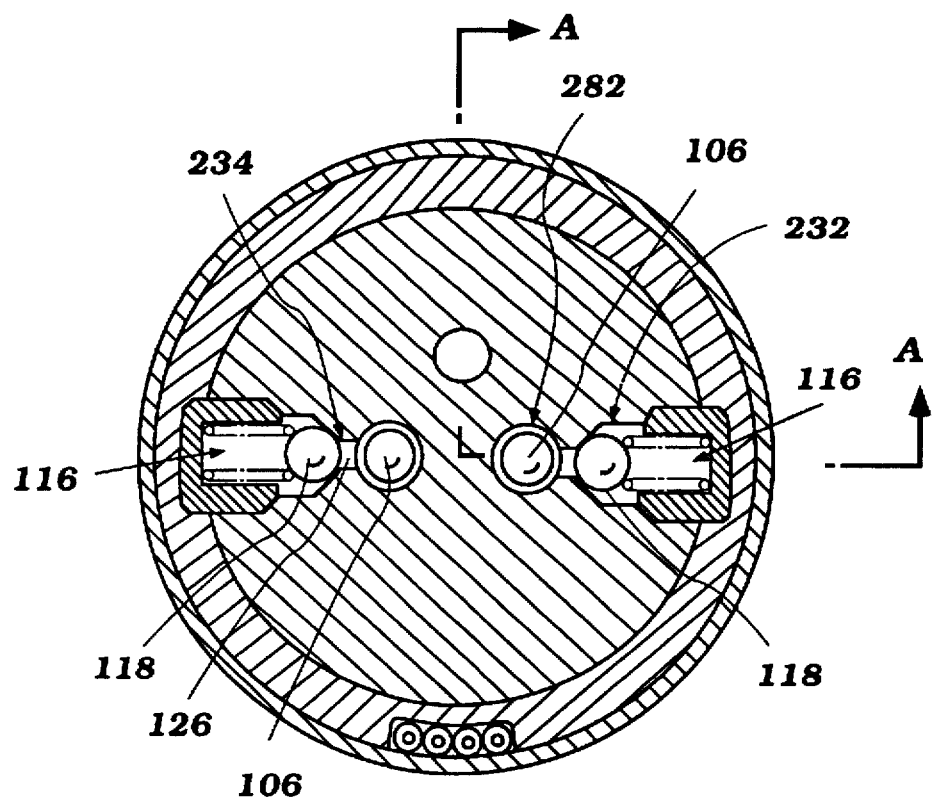
FIG. 11 is a cross-sectional view taken along lines B—B of FIG. 10.

Fifth Embodiment: The coaxial alignment of the first valve axis and the piston, along with the orthogonal arrangement of the first and second valves, allows for a very compact multi-piston configuration. These multi-piston pumps are especially suited for use with multi-cylinder two-cycle engines. An example of this multi-piston embodiment of the pump of the present invention is shown in FIGS. 10 and 11, in which elements with like numbers refer to previously described elements. The electromagnetic pump 230 in this embodiment can supply small quantities of oil to two locations simultaneously, using a single pump and single solenoid. The pump 230 has a first sub-assembly 232 comprising a first valve, such as one-way chamber valve 104, the associated one-way outlet valve 116, and the associated fluid passages 92, 94, 102, 114, 124 and 98, and the associated piston 110 and chamber 111, spring 134 and retainer 132, and chamber 126. The first axis common to the chamber valve 104 and associated piston 110 reciprocating in chamber 111 is no longer located on the longitudinal axis of the pump body, but is offset radially outward from that longitudinal axis along with the piston 110 and chamber 111. The first axis is still aligned with, and substantially parallel to that longitudinal axis. The second axis of outlet valve 16 is orthogonal to the longitudinal axis, extending radially to the longitudinal axis.

A second sub-assembly 234 comprises the same parts but in a different radial orientation relative to the longitudinal axis of the pump 280. Advantageously, the second sub-assembly 234 is rotated 180°, or directly opposite, sub-assembly 232 as shown in FIG. 11. Sub-assembly 234 thus also comprises one-way chamber valve 104 and one-way valve 116 along with the associated fluid passages 92, 102, 114, 124 and 98 and the associated piston 110 and chamber 111, spring 134 and retainer 132, and chamber 126. In each of the first and second sub-assemblies 232, 234 (FIG. 11), the chamber valve 104 and piston 110 are preferably coaxial, and the one-way valves 116 are radially oriented, and preferably orthogonal to the coaxial axis of the adjacent valve 104 and piston 110.

The two pistons 110 are simultaneously moved relative to the chamber walls 111 by a single solenoid 234. The two pistons 110 and two output stubs 90 are positioned equi-angularly (180°) on the same circumference and point in the aligned parallel to the longitudinal axis of the pump 230 (the vertical axis in FIG. 10). The lower end of rod 158 has a fitting 238 with two members 240 located 180° apart and aligned to abut the top ends 130 of pistons 110. The fitting 238 advantageously comprises a stationary outer, ring-like member 242 that extends over a portion of the top end 130 of piston 110 to limit the motion of the pistons. The inner portion 240 of fitting 238 moves axially to activate the pistons 110 and valves 104, 116. A single lower guide member 150 guides the axial movement of rod 158. A larger and stronger rubber oil seal 246 seals the rod 158 and at the top of the pump housing. A retainer cap 248 engages the outside of the pump body 282 to hold the seal 246 and fitting 238 in position.

Thus, a single solenoid 234 is used to drive two pistons 110 simultaneously to make it possible for the electromagnetic pump 230 to supply precise, small quantities of oil to two output stumps 90, simultaneously. As the same solenoid 234 is moving two pistons 110, the amount of movement is identical. Both pistons 110 also perform the same operation at the same time, in terms of expelling oil from the chamber 126 and sucking oil into that chamber. Further, because the two plungers are set equi-angularly on the circumference of the same circle and are aligned in the same direction, it is possible to use a single solenoid 234 to smoothly drive two pistons 110 for a stable supply of small amounts of oil to two output stumps. Moreover, like the prior embodiments one of the valves 104, 116 intermittently occupies the same volume as the relative motion between piston 110 and chamber 111. Thus, a smaller chamber 126 is achievable along with the associated benefits such as increased pressure ration and increased pumping accuracy.

Figure 12:
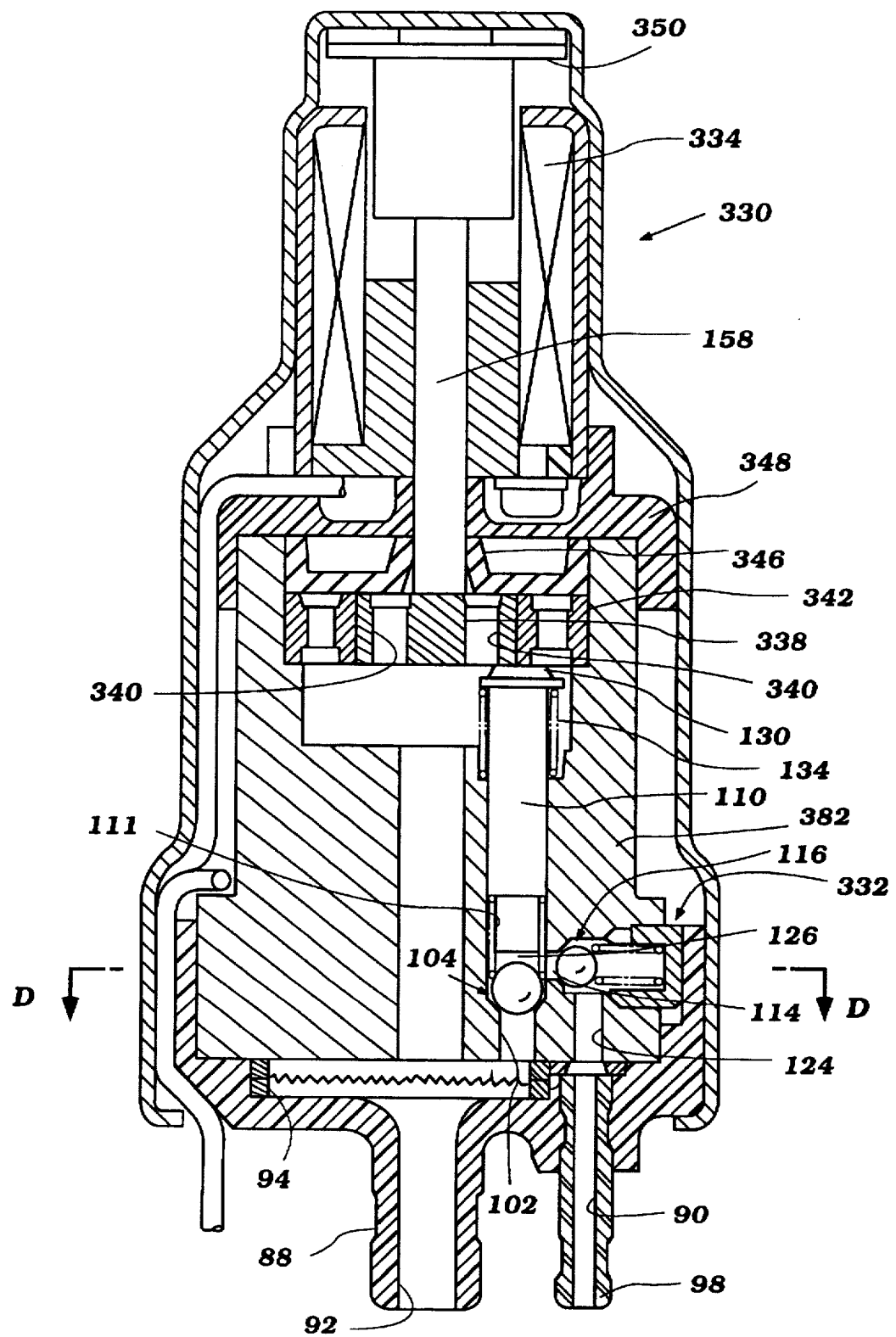
FIG. 12 is a sectional view of a further embodiment of an electromagnetic pump of this invention along line C—C of FIG. 13.
Figure 13:
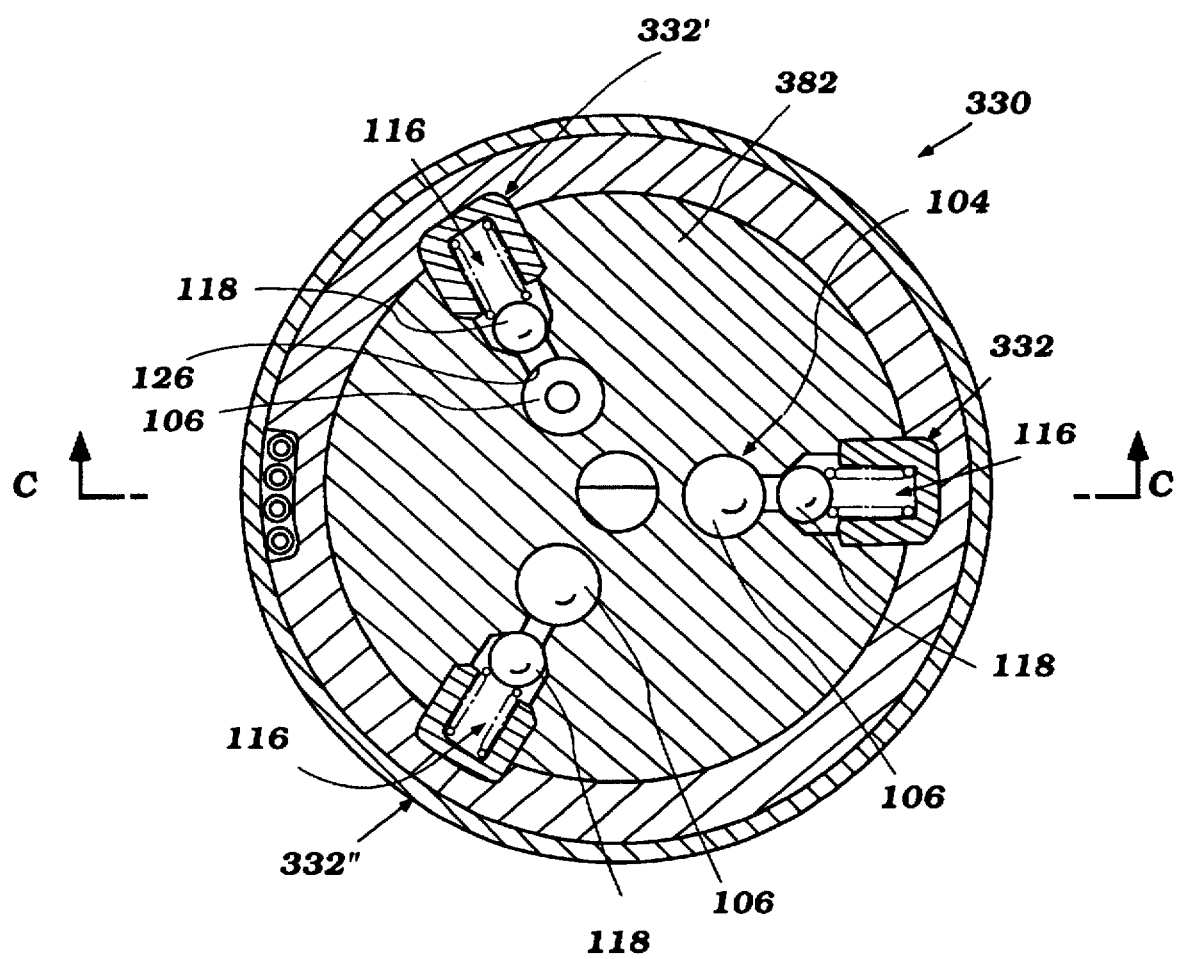
FIG. 13 is a cross-sectional view taken a long lines D—D of FIG. 12.

Sixth Embodiment: A still further multi-piston embodiment is shown in FIGS. 12 and 13, in which elements with like numbers refer to previously described elements. The electromagnetic pump 330 can simultaneously supply oil to three locations with one pump unit. The pump 330 has three sets of sub-assemblies, each of which is the same but rotated 120° from the adjacent sub-assemblies. This is the same general construction as the prior embodiment, but with three sub-assemblies instead of two. Thus, the first sub-assembly 332 comprises a first inlet valve such as one-way chamber valve 104, and the associated outlet valve such as one-way valve 116, along with the associated fluid passages 92, 102, 114, 124 and 98, and the associated piston 110 and chamber 111, spring 134 and retainer 132, and chamber 126. The chamber valve 104 is no longer located on the longitudinal axis of the pump body, but is offset from that longitudinal axis. The second sub-assembly 332' has the same parts as the first sub-assembly 332, but rotated 120° as best seen in FIG. 13. The third sub-assembly 332" has the same parts as the first sub-assembly 332, but rotated 120° as best seen in FIG. 13. Each first valve assembly 104 and piston 110 have associated with them a second valve assembly 116 (FIG. 13).

The three pistons 110 are driven simultaneously by a single solenoid 334. The three pistons 110 and three output stubs 90 are positioned equi-angularly (120°) on the relative the longitudinal axis of the pump 330 (the vertical axis in FIG. 12). The lower end of rod 158 has a fitting 338 with three members 340 located 120° apart and aligned to abut the top ends 130 of pistons 110. The fitting 338 advantageously comprises a stationary outer, ring-like member 342 that extends over a portion of the top end 130 of piston 110 to limit the motion of the pistons. The inner portion of fitting 338 moves axially to activate the pistons 110 and valves 104, 116. A single lower guide member 150 guides the axial movement of rod 158. A rubber oil seal 346 seals the rod 158 and at the top of the pump housing. A cap 348 extends over the pump body 382 to hold the seal 346 and fitting 342 in place. A flange 350 on the top end of rod 158 limits the motion of piston 110.

The first axis common to the chamber valve 104 and associated piston 110 is no longer located on the longitudinal axis of the pump body, but is offset radially outward from that longitudinal axis. The first axis is still aligned with, and substantially parallel to that longitudinal axis. The second axis of each second valve assembly 116 associated with each first valve assembly 104 is orthogonal to the longitudinal axis, extending radially to the longitudinal axis.

Thus, a single solenoid 334 is used to drive three pistons 110 simultaneously to make it possible for the electromagnetic pump 330 to supply precise, small quantities of oil to three output stumps 90, simultaneously. All three pistons 110 perform the same operation at the same time, in terms of expelling oil from the chamber 126 and sucking oil into that chamber. Further, because the three plungers are set equi-angularly on the circumference of the same circle and are aligned in the same direction, it is possible to use a single solenoid 334 to smoothly drive two pistons 110 for an identical and stable supply of small amounts of oil to three output stumps.

Figure 14:
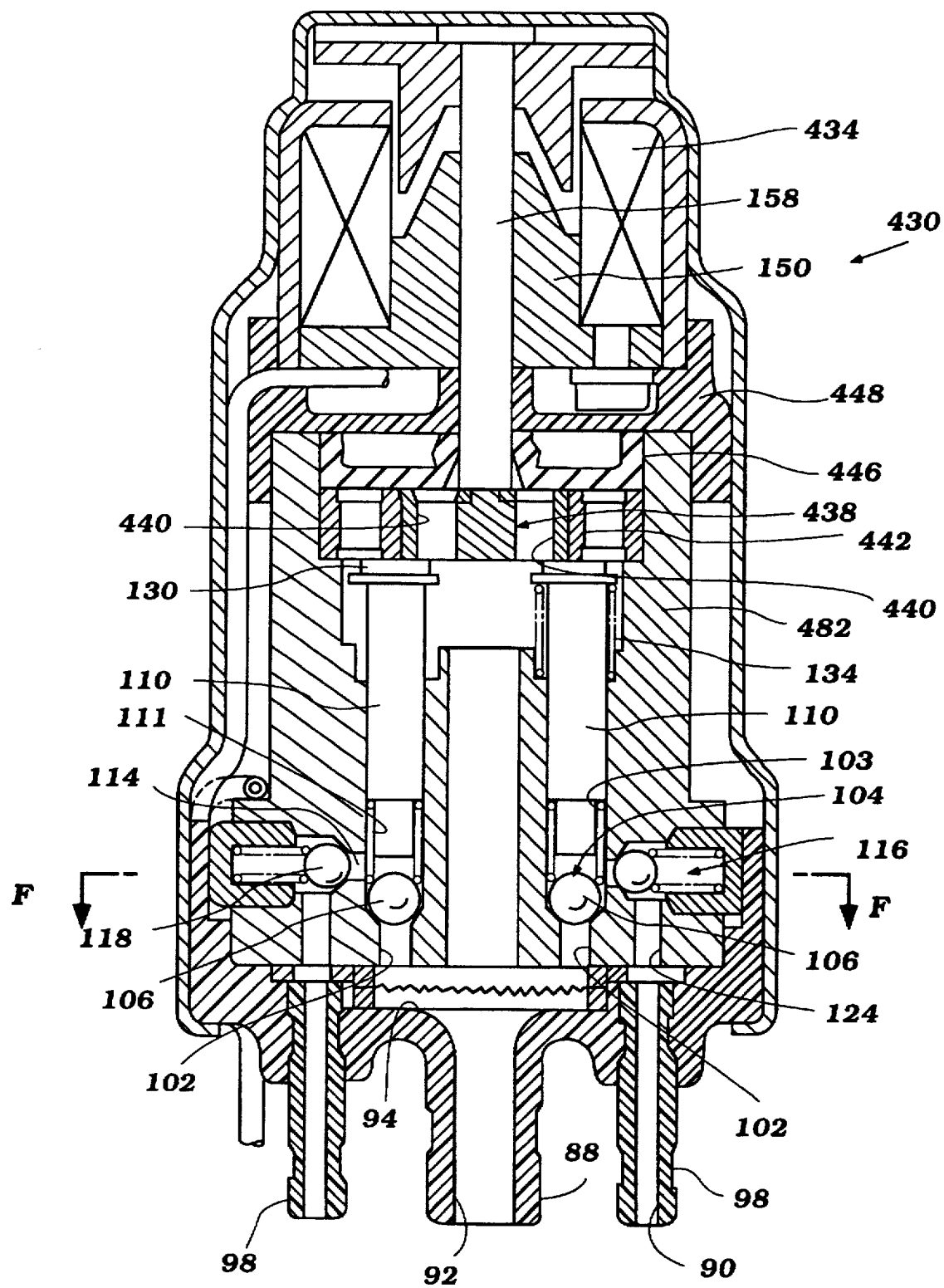
FIG. 14 is a sectional view of a further embodiment of an electromagnetic pump according to this invention, taken along lines E—E of FIG. 15.
Figure 15:
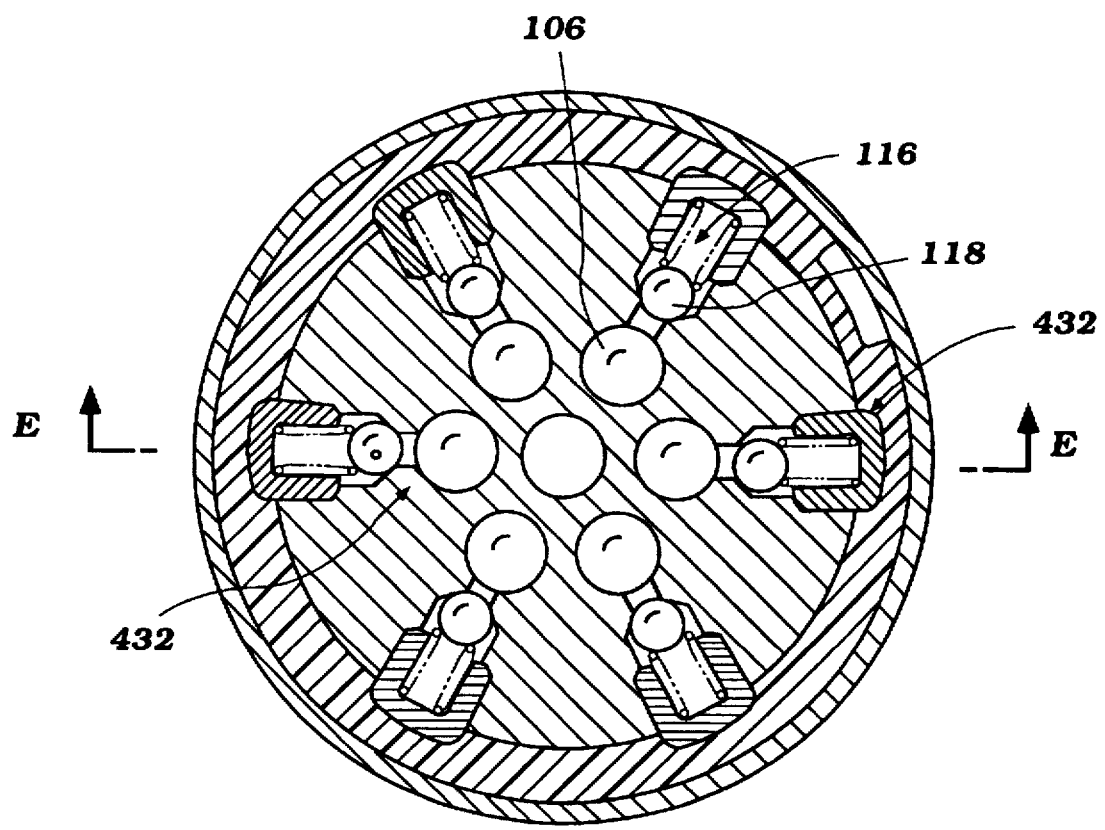
FIG. 15 is a sectional view along line F—F of FIG. 14

Seventh Embodiment: As reflected by the prior two embodiments, the number of sub-assemblies can be increased to any desired number. Thus, a final embodiment is shown in FIGS. 14 and 15, in which parts with like numbers refer to previously described elements. The electromagnetic pump 430 can simultaneously supply oil to six locations with one pump unit, for example, to six cylinders of an engine 40 (FIG. 2). This pump 430 has six sets of sub-assemblies 432. Each of the sub-assemblies 432 comprise a first one-way chamber valve 104 and the associated one-way outlet valve 116 along with the associated fluid passages 92, 94, 102, 114, 124 and 98, and the associated piston 110 and chamber 111, spring 134 and retainer 132, and chamber 126. The chamber valve 104 is no longer located on the longitudinal axis of the pump body, but is offset radially outward from that longitudinal axis. The six sub-assemblies are advantageously symmetrically spaced about the longitudinal axis of the pump 430, and preferably arrayed equi-angularly (60°) along the circumference of the same circle with the pistons 110 aligned in the same direction (the vertical direction in FIG. 14). As reflected in FIG. 14, the balls 106, 118 need not be the same size, as in the depicted embodiment the balls 106 on the chamber valve 104 are larger than the balls 118 on the valves 116. This is also true for the other embodiments of this invention.

The six pistons 110 are driven simultaneously by a single solenoid 434. The six pistons 110 and six output stubs 90 are advantageously positioned equi-angularly (60°) on the relative the longitudinal axis of the pump 430 (the vertical axis in FIG. 14). A single inlet stub 88 is provided, with the cavity 94 being in fluid communication with each of the inlet passages 102 associated with each of the six sub-assemblies 432. This construction is also possible to achieve with the other embodiments using multiple sub-assemblies of the type shown in sub-assembly 432.

The lower end of rod 158 has a fitting 438 with six members 440 located 120° apart and aligned to abut the top ends 130 of pistons 110. The fitting 438 advantageously comprises a stationary outer, ring-like member 442 that extends over a portion of the top ends 130 of pistons 110 to limit the motion of the pistons. The inner portion of fitting 438 moves axially to activate the pistons 110 and valves 104, 116. A single lower guide member 150 guides the axial movement of rod 158. A rubber oil seal 446 seals the rod 158 and at the top of the pump housing. A retainer cap 448 fits over the pump body 482 to hold the seal 446 and fitting 438 in place. There is thus advantageously provided means for a single solenoid to simultaneously drive six pistons 110, thereby making it possible to supply small quantities of oil to six locations simultaneously.

Because the piston 110 exerts a strong closing pressure on the one-way valves 104, 116 when no current is being applied to the solenoid 434 fluid cannot flow through the one-way valves, and this increases the accuracy in the volume of the fluid pumped with each stroke of the piston 110. Further, because the operation of the solenoid can be electrically ascertained by an ON-OFF signal from electrically communicating parts, or by the amount of piezostatic electricity detected from an appropriately interposed element, the pump is highly fail-safe. Further, it is possible to simultaneously drive a plurality of plungers with a single solenoid, thereby making it possible to simultaneously supply the same, small quantities of fluid to a plurality of targets. The electromagnetic pump is both compact and inexpensively structured. Because the plurality of plungers are located along the circumference of the same circle at equal angles, it is possible to smoothly drive the plurality of plungers with a single solenoid in a compact space.

This specification is based on prior application numbers Hei 7-265637 filed Oct. 13, 1995 with Seiichiro Yamada as the inventor, and Hei7-283897, filed Oct. 31, 1995, with Seiichiro Yamada as the inventor, and the contents of both applications are incorporated herein by reference.

Although exemplary embodiments of this invention have been disclosed for the purposes of illustration, it will be understood that various changes, modifications and substitutions can be made without departing from the spirit of the invention as defined by the claims which follow.

What is claimed is:

1. An electromagnetic pump comprising a solenoid driving means, said solenoid driving means driving at least one pumping member of a pair of relatively moveable pumping members, said pair of pumping members defining a pumping chamber of a volume that varies cyclically upon relative movement of said members between a first position defining a maximum volume area and a second position defining a minimum, clearance volume area that is included in said maximum volume area, a pair of one one-way valves for controlling the flow of fluid upon such relative movement respectively into and out of said pumping chamber, at least one of said one-way valves including a first valve element moveable in a first direction between an opened position and a closed position in response to pressure differences across said first valve element, said first valve element being positioned within said pumping chamber minimum, clearance volume area when said pumping members are in said second position, said first valve element being moveable out of said minimum, clearance volume area and into a location previously occupied by one of said pumping members upon relative movement of said pumping members from said second position toward said first position, and the other of said one-way valves including a second valve moveable in a second direction not parallel to said first direction between an opened position and a closed position in response to pressure differences across said second valve element.

2. A pump as defined in claim 1, wherein the one of the moveable pumping members urges the first valve element into a closed position at at least one position of the member's movement.

3. A pump as defined in claim 1, wherein a piezoelectric element is interposed between the solenoid and the one pumping member so that electrical energy is generated by the piezoelectric element when the solenoid is activated in order to signal that the pump is operating.

4. A pump as defined in claim 1, further comprising a second pair of relatively moveable pumping members defining a second pumping chamber of a volume that varies cyclically upon relative movement of said second members, at least one further one-way valve for controlling the flow of fluid upon such relative movement in at least one direction, said further one-way valve including a further valve element moveable between an opened position and a closed position in response to pressure differences across said further valve element, said further valve element being positioned within said second pumping chamber when in one of said positions at a location occupied by one of said second pumping members at at least one position of its relative movement, the first and second pumping members moving cyclically along axes that are substantially parallel.

5. A pump as defined in claim 4, wherein the solenoid also drives one of the second pair of pumping members to move both of the one pumping members cyclically and vary the volume of both of the pumping chamber.

6. An electromagnetic oil pump comprising a first one-way valve aligned along a first axis, the valve comprising a first ball urged against a first valve seat by a first spring, a piston constrained to reciprocate along the first axis and positioned relative to the first valve so that the piston is immediately adjacent the first ball at one extreme limit of travel, a first spring interposed between the first ball and the piston to urge the ball and piston apart, a second one-way valve aligned along a second axis that is not aligned with the first axis with the second valve being associated with and in fluid communication with the first valve and comprising a second ball resiliently urged against a second valve seat, the first and second balls being adjacent one another to define a pump chamber with a minimum volume smaller than the volume of one of the balls; and a solenoid in driving communication with the piston to cause the piston to move to a predetermined position when power is applied to the solenoid, with the first spring urging the piston to an alternate position when power is not applied to the solenoid.

7. An electromagnetic oil pump as defined in claim 6, wherein the first and second valves are orthogonal to one another.

8. An electromagnetic oil pump as defined in claim 6, wherein the piston urges the first ball against the first valve seat when power is applied to the solenoid.

9. An electromagnetic oil pump as defined in claim 6, further comprising a spring urging the piston against the first ball to close the first valve when power is not applied to the solenoid.

10. An electromagnetic oil pump as defined in claim 6, further comprising a piezoelectric element interposed between the piston and solenoid so that electrical energy is generated by the piezoelectric element when the solenoid moves the piston, and wherein the energy is detected to verify the pump is operating.

11. An electromagnetic oil pump as defined in claim 6, wherein the piston is electrically conductive and in electrical communication with a sensor that detects the completion of an electrical circuit when the solenoid moves the piston.

12. An electromagnetic oil pump as defined in claim 6, wherein the first valve and first piston in fluid communication with the associated second valve comprise a subassembly, and wherein there are a plurality of such subassemblies in which the pistons reciprocate along axes that are substantially parallel, and wherein the solenoid is in driving communication with each of the pistons to move the pistons the same predetermined distances when power is applied to the solenoid.

13. An electromagnetic oil pump as defined in claim 6, wherein the second axis of the each of the second valves are orthogonal to the axis of the piston associated with each second axis, and directed in a radial direction to the associated piston axis.

14. An electromagnetic oil pump as defined in claim 6, wherein the minimum volume of the fluid chamber is less than about 0.1 cc, and wherein the fluid pumped through the second valve with each pumping stroke of the piston is between about 0.001 to 0.05 cc.

15. An electromagnetic oil pump as defined in claim 6, wherein power is applied to the solenoid for between about 10 msec to 40 msec.

16. An electromagnetic oil pump as defined in claim 12, wherein the output valve is in fluid communication with a two-cycle engine, and wherein the operation of the pump is varied in response to the operating condition of the engine.

17. An electromagnetic oil pump as defined in claim 12, further comprising a cam interposed between the piston and the solenoid so that the cam can vary the length of the position of the piston to vary the minimum volume of the pump chamber, and wherein the output valve is in fluid communication with a two-cycle engine, and wherein the cam position is varied in response to the operating condition of the engine.

18. An electromagnetic oil pump as defined in claim 12, wherein the output valve is in fluid communication with a two-cycle engine, and wherein the operation of the pump is varied in response to the operating condition of the engine.

* * * * *

UNITED STATES PATENT AND TRADEMARK OFFICE
CERTIFICATE OF CORRECTION

PATENT NO. : 5,800,139
DATED : September 1, 1998
INVENTOR(S) : Yamada

It is certified that error appears in the above-identified patent and that said Letters Patent is hereby corrected as shown below:

Inventors,
On the title page, item [73], delete "Yamada" and insert –Yamaha--

Signed and Sealed this

Twelfth Day of January, 1999

Attest:

Attesting Officer

*Acting Commissioner of Patents and Trademarks*